United States Patent
Fenichel et al.

(10) Patent No.: US 10,979,422 B1
(45) Date of Patent: Apr. 13, 2021

(54) ADAPTIVE ARTIFICIAL INTELLIGENCE SYSTEMS AND METHODS FOR TOKEN VERIFICATION

(71) Applicant: Capital One Services, LLC, McLean, VA (US)

(72) Inventors: Allison Fenichel, Brooklyn, NY (US); Brice Elder, Brooklyn, NY (US); Varun Gupta, Edison, NJ (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/821,368

(22) Filed: Mar. 17, 2020

(51) Int. Cl.
*H04L 29/06* (2006.01)
*G06N 20/00* (2019.01)

(52) U.S. Cl.
CPC ......... *H04L 63/0853* (2013.01); *G06N 20/00* (2019.01); *H04L 63/0876* (2013.01)

(58) Field of Classification Search
CPC .. H04L 63/0853; H04L 63/0876; G06N 20/00
See application file for complete search history.

(56) References Cited

U.S. PATENT DOCUMENTS

| | | | |
|---|---|---|---|
| 8,458,487 B1* | 6/2013 | Palgon | H04L 63/0807 713/185 |
| 10,353,905 B2* | 7/2019 | Ramachandran | G06F 16/81 |
| 2016/0085971 A1* | 3/2016 | Saxena | G06F 21/602 726/26 |
| 2016/0330220 A1* | 11/2016 | Dulkin | H04L 63/1408 |
| 2018/0218627 A1* | 8/2018 | Smith Lewis | G09B 5/065 |
| 2019/0050738 A1* | 2/2019 | Sivagnanam | G06F 16/90335 |
| 2019/0196938 A1* | 6/2019 | Mathen | G06F 11/3616 |
| 2019/0303666 A1* | 10/2019 | Summers | G06N 7/005 |
| 2020/0128025 A1* | 4/2020 | Sant-Miller | G06N 5/02 |
| 2020/0274898 A1* | 8/2020 | Xie | H04L 29/06 |

* cited by examiner

*Primary Examiner* — Michael R Vaughan
(74) *Attorney, Agent, or Firm* — Finnegan, Henderson, Farabow, Garrett & Dunner, LLP

(57) ABSTRACT

Systems and methods for adaptive token verification are disclosed. For example, a system may include at least one memory storing instructions and one or more processors configured to execute the instructions to perform operations. The operations may include training a verification model to verify tokenized requests based on system identifiers. The operations may include receiving a tokenized request from an external system, the request comprising a system identifier of the external system. The operations may include generating output of the verification model based on the system identifier, and, based on the output, performing one of granting the request or blocking the request.

18 Claims, 5 Drawing Sheets

500

ADAPTIVE ARTIFICIAL INTELLIGENCE SYSTEMS AND METHODS FOR TOKEN VERIFICATION

BACKGROUND

"Tokens" as used herein may include substitute data (e.g., non-sensitive data substituting for sensitive data). Tokens may have no intrinsically exploitable value, thereby protecting sensitive, exploitable data from malicious actors. Systems and methods to verify tokens are needed in many fields. Tokenization may be used to protect sensitive data in, for example, fields encompassing many data types, including medical records, driving records, voter registrations, user accounts, educational data, bank accounts, financial records, personal identifiers such as social security numbers, and/or other types of sensitive data.

Often a request to process tokenized data may be received from a requesting system without advance knowledge of whether a requesting system is legitimate. That is, merely possessing a token does not guarantee that use of a token is proper. Further, tokens may be properly accessed and used by unanticipated entities.

To illustrate this problem, in an example, a virtual card number (i.e., token representing a real credit card) may be established for paying an approved payee. The approved payee may be "Child Corporation" having known system identifiers (e.g., a name, a web address, a physical address, or other identifier). However, "Child Corporation" may use "Parent Corporation's" payment system. Hence, "Parent Corporation" may be a legitimate user of the virtual card number because the virtual card number may be submitted when making a purchase at "Child Corporation's" online store or physical store. However, when a payment system receives a transaction request including a virtual card number, and the request contains identifiers associated with "Parent Corporation," the payment system may improperly deny the request because the request did not contain identifiers associated with "Child Corporation."

As another illustrative example, a malicious actor may acquire a virtual card number and send an unauthorized transaction request using the virtual card number to a payment system. The malicious actor may transmit a system identifier with the request that appears to be legitimate and associated with an approved payee (e.g., web addresses, phone numbers, or other system identifiers that may mimic identifiers associated with "Child Corporation"). The payment system may improperly grant a request because the system is not adaptive and may be incapable of learning to detect fraudulent system identifiers. Thus, conventional approaches may be unable to detect a malicious actor mimicking system identifiers of a legitimate system.

Conventional approaches to attempt to solve problems associated with unauthorized token use may include restricting token use to particular environments (e.g., tied to a particular entity). For example, a management system may grant requests to use tokens that originate from known Internet Protocol (IP) addresses or domains but block other requests. These approaches, however, may not be sufficiently flexible to correctly process requests (i.e., correctly determine whether to grant or block requests) from unanticipated or unknown systems legitimately attempting to use a token (e.g., "Parent Corporations" use of a token in the foregoing example).

In addition, conventional systems may include using a single-use token and deny attempts to reuse tokens. For example, a token may be configured to allow access or use of sensitive data a single time. As a non-limiting illustration, a tokenized credit card number may be linked to a real credit card number and configured to be used a single time for a single vendor. Single-use tokens may be inconvenient to users. For example, single-use tokens may require repeatedly requesting single-use tokens for a set of similar actions (e.g., requesting a single-use token each time a user pays a same vendor or for each of a plurality of vendors).

Although the foregoing examples arise in the field of commerce, one of skill in the art will appreciate that analogous problems may arise in other fields that rely on tokenization for data security.

Therefore, in view of the shortcomings and problems with conventional approaches to verifying tokens, there is a need for unconventional approaches that can adaptively verify tokens, including multiple use tokens, thereby providing advantages over prior solutions by properly granting or denying requests that otherwise may be improperly granted or denied.

SUMMARY

The disclosed embodiments provide unconventional methods and systems for verifying tokenized requests. Embodiments consistent with the present disclosure are rooted in computer technology and may include using machine learning methods to grant (i.e., allow) or block (i.e., deny) tokenization requests based on system identifiers and/or other data associated with a tokenization request. Systems and methods according to disclosed embodiments may learn to grant requests despite one or more mismatches between tokenization request data and known system identifiers associated with a token. Embodiments improve upon conventional approaches because, unlike conventional approaches, a match or mismatch between tokenization request data and known system identifiers may not be dispositive. Accordingly, this approach is advantageous over the conventional approach because, among other reasons, this approach results in more accurate granting or denial of requests and may adapt over time to changing patterns of tokenized data use. Embodiments may expand token use by allowing the reuse of tokens in situations for which conventional approaches may deny reuse. Embodiments may further expand token use by allowing use of tokens in requests associated with previously-unknown entities. Therefore, the embodiments provide advantages at least by increasing data security.

Consistent with the present embodiments, an adaptive token verification system is disclosed. The system may include at least one memory storing instructions and one or more processors configured to execute the instructions to perform operations. The operations may include training a verification model to verify tokenized requests based on system identifiers. The operations may include receiving a tokenized request from an external system, the request comprising a system identifier of the external system, and generating output of the verification model based on the system identifier. The operations may include, based on the output, performing one of granting the request or blocking the request.

Consistent with the present embodiments, an adaptive token verification method is disclosed. The method may include training a verification model to verify tokenized requests based on system identifiers. The method may include receiving a tokenized request from an external system, the request comprising a system identifier of the external system, and generating output of the verification model based on the system identifier. The method may include, based on the output, performing one of granting the request or blocking the request.

Consistent with other disclosed embodiments, non-transitory computer readable storage media may store program instructions, which are executed by at least one processor device and perform any of the methods described herein.

The disclosed systems and methods may be implemented using a combination of conventional hardware and software as well as specialized hardware and software, such as a machine constructed and/or programmed specifically for performing functions associated with the disclosed method steps. The foregoing general description and the following detailed description are exemplary and explanatory only and are not restrictive of the claims.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DESCRIPTION OF THE EMBODIMENTS

Consistent with disclosed embodiments, adaptive artificial intelligence systems and methods for token verification are disclosed. As explained above, disclosed systems and methods improve data security.

Reference will now be made in detail to exemplary embodiments, examples of which are illustrated in the accompanying drawings and disclosed herein. Wherever convenient, the same reference numbers will be used throughout the drawings to refer to the same or like parts. The disclosed embodiments are described in sufficient detail to enable those skilled in the art to practice the disclosed embodiments. It is to be understood that other embodiments may be utilized and that changes may be made without departing from the scope of the disclosed embodiments. Thus, the materials, methods, and examples are illustrative only and are not intended to be necessarily limiting.

Figure 1:
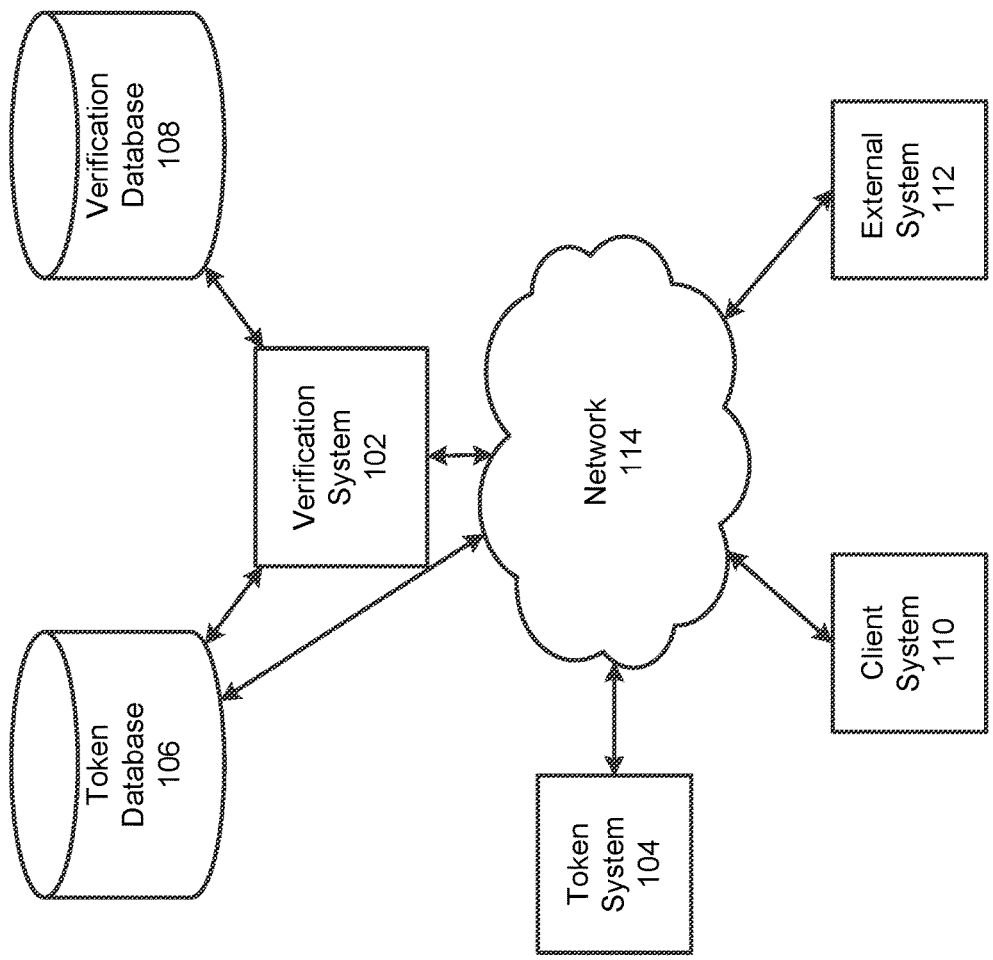
FIG. 1 is a block diagram of an exemplary system for adaptive token verification, consistent with disclosed embodiments.

FIG. 1 is a block diagram of an exemplary system for adaptive token verification, consistent with disclosed embodiments. As shown, system 100 may include a verification system 102, a token system 104, a token database 106, a verification database 108, a client system 110, and/or an external system 112. Some or all components of system 100 may be connected to each other via a network 114. Components of system 100 may be configured to implement methods of encryption and other data security methods, e.g., when generating or using tokenized data, consistent with disclosed embodiments.

In some embodiments, aspects of system 100 may be implemented on one or more cloud services designed to generate ("spin-up") ephemeral container instances (e.g., AMAZON LAMBDA instances) in response to event triggers, assign one or more tasks to a container instance, and terminate ("spin-down") a container instance upon completion of a task. By implementing methods using cloud services, disclosed systems may efficiently provision resources based on demand and provide security advantages because the ephemeral container instances may be closed and destroyed upon completion of a task. That is, the container instances may not permit access from outside user terminals and/or remote shell tools like SSH, RTP, FTP, and/or CURL, for example. Further, terminating container instances may include destroying data, thereby protecting sensitive data. Destroying data can provide security advantages because it may involve permanently deleting data (e.g., overwriting data) and associated file pointers.

As will be appreciated by one skilled in the art, the components of system 100 can be arranged in various ways and implemented with any suitable combination of hardware, firmware, and/or software, as applicable. For example, as compared to the depiction in FIG. 1, system 100 may include a larger or smaller number of verification systems, token systems, token databases, verification databases, client devices, external systems, and/or networks. In addition, system 100 may further include other components and/or devices not depicted that perform and/or assist in the performance of one or more processes, consistent with the disclosed embodiments. The exemplary components and arrangements shown in FIG. 1 are not intended to limit the disclosed embodiments.

Verification system 102 may be configured to implement adaptive artificial intelligence systems and methods for token verification, consistent with disclosed embodiments. As described below in greater detail with respect to FIG. 2, verification system 102 may include a computing device, a computer, a server, a server cluster, a plurality of server clusters, and/or a cloud service, consistent with disclosed embodiments. Verification system 102 may include at least one memory and one or more processors configured to perform operations consistent with disclosed embodiments. In some embodiments, verification system 102 may include hardware, software, and/or firmware modules. Verification system 102 may include computing systems configured to generate, receive, retrieve, store, and/or provide models and/or data, consistent with disclosed embodiments. Verification system 102 may include computing systems configured to generate and train models, consistent with disclosed embodiments. Verification system 102 may be configured to receive data from, retrieve data from, and/or transmit data to other components of system 100 and/or computing components outside system 100 (e.g., via network 114). Verification system 102 is disclosed in greater detail below (in reference to FIG. 2).

Token system 104 may be configured to perform methods of tokenization for data security, consistent with disclosed embodiments. Tokenization may include methods of substituting sensitive data with non-sensitive data (e.g., a token). Sensitive data may include personal identifiers, usernames, passwords, account numbers, credit card numbers, and/or other sensitive data. Tokenization may include generating, retrieving, and/or storing a token. A token may include a virtual number (i.e., a sequence of numbers representing sensitive data such as an account number, a personal identifier, and/or other sensitive data). Generating a token may include generating randomized data (e.g., a token may comprise randomized characters and/or numbers). In some embodiments, token system 104 may manage tokens in a data storage, including a memory of token system 104 and/or token database 106. Managing tokens may include storing tokens, retrieving tokens, updating tokens, removing or deleting tokens, and/or perform other actions to manage tokens.

Token system 104 may include a computing device, a computer, a server, a server cluster, a plurality of server clusters, and/or a cloud service, consistent with disclosed embodiments. Token system 104 may include at least one memory and one or more processors configured to perform operations consistent with disclosed embodiments. In some embodiments, token system 104 may include hardware, software, and/or firmware modules. Token system 104 may include computing systems configured to generate, receive, retrieve, store, and/or provide tokens, consistent with disclosed embodiments. In some embodiments, token system 104 may be a component of verification system 102 (not shown).

Token database 106 may include one or more databases configured to store tokens for use by system 100, consistent with disclosed embodiments. In some embodiments, token database 106 may be configured to store tokens and/or one or more indexes of tokens, consistent with disclosed embodiments. Token database 106 may include a cloud-based database (e.g., AMAZON WEB SERVICES RELATIONAL DATABASE SERVICE) or an on-premises database. Token database 106 may include tokens and corresponding sensitive data and/or other data, consistent with disclosed embodiments. Token database 106 may include data received from one or more components of system 100 and/or computing components outside system 100 (e.g., via network 112). In some embodiments, token database 106 may be a component of verification system 102 and/or token system 104 (not shown).

Verification database 108 may include one or more databases configured to store data for use by system 100, consistent with disclosed embodiments. Verification database 108 may be configured to store verification data for use by verification system 102, consistent with disclosed embodiments. Verification database 108 may include a cloud-based database (e.g., AMAZON WEB SERVICES RELATIONAL DATABASE SERVICE) or an on-premises database. In some embodiments, verification database 108 may be a component of verification system 102 (not shown).

Client system 110 may be configured to request tokens from token system 104 and provide tokens to other components of system 100 (e.g., to provide tokens to external system 112). Client system 110 may include at least one memory and one or more processors configured to perform operations consistent with disclosed embodiments. In some embodiments, client system 110 may include hardware, software, and/or firmware modules. In some embodiments, client system 110 may be or may include a virtual private cloud, a local computing environment (e.g., a personal computer, terminal, kiosk, or workstation), a server, a server cluster, a device (e.g., a mobile device, a tablet, a laptop, etc.), and/or any other computing system.

External system 112 may be configured to request tokens from token system 104 and provide tokens to other components of system 100 (e.g., to provide tokens to external system 112). External system 112 may include one or more memory units and one or more processors configured to perform operations consistent with disclosed embodiments. In some embodiments, external system 112 may include hardware, software, and/or firmware modules. External system 112 may be a user device. External system 112 may include a mobile device, a tablet, a personal computer, a terminal, a kiosk, a server, a server cluster, a cloud service, a storage device, a specialized device configured to perform methods according to disclosed embodiments, or the like. In some embodiments, external system 112 may include one or more components as described in reference to verification system 102 (FIG. 2).

Network 114 may be a public network or private network and may include, for example, a wired or wireless network, including, without limitation, a Local Area Network, a Wide Area Network, a Metropolitan Area Network, an IEEE-standard-compliant wireless network (e.g., "Wi-Fi"), a network of networks (e.g., the Internet), a land-line telephone network, or the like. Network 114 may be connected to other networks (not depicted in FIG. 1) to connect the various system components to each other and/or to external systems or devices. In some embodiments, network 114 may be a secure network and require a password and/or other security data to access the network.

Figure 2:
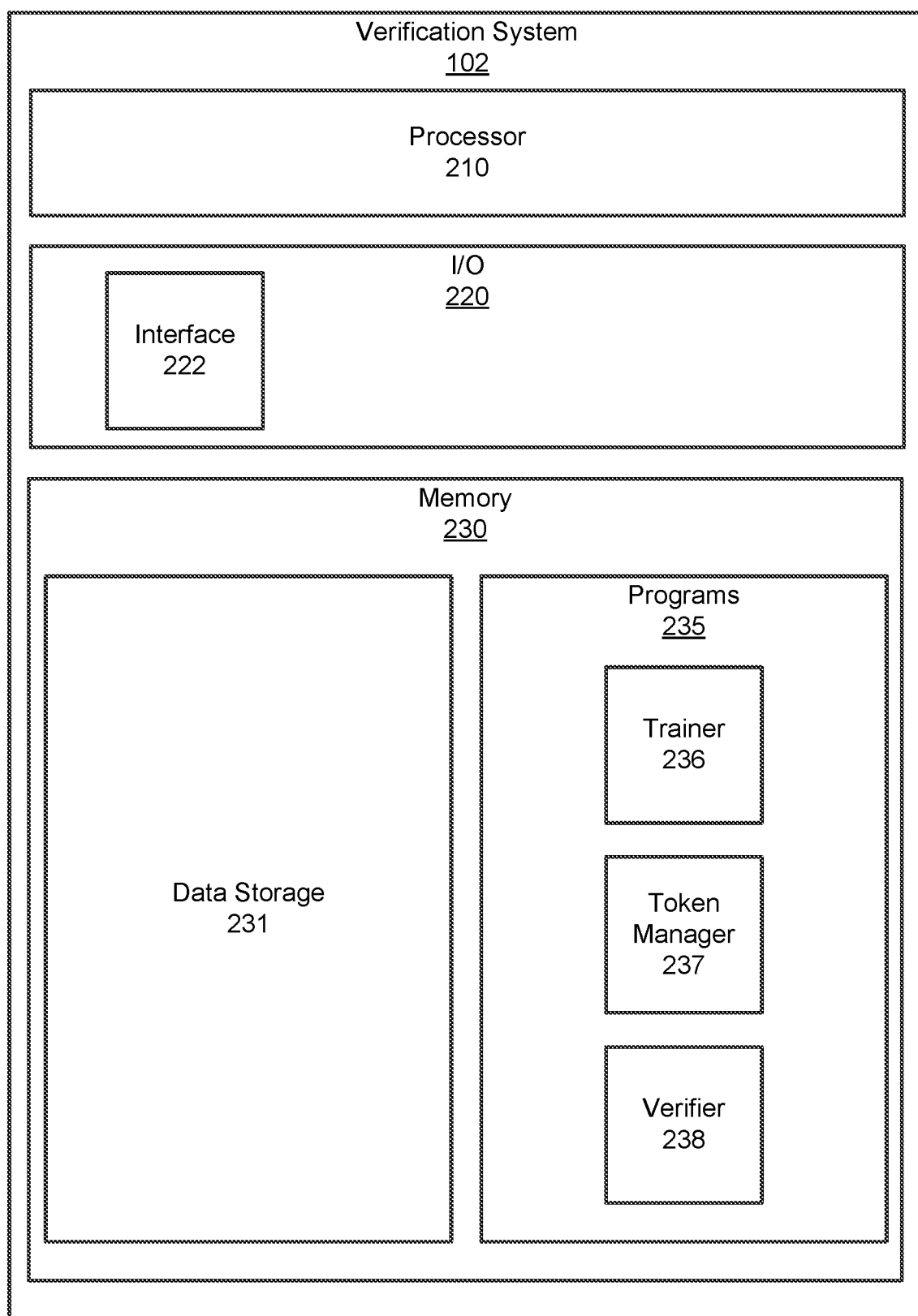
FIG. 2 is a block diagram of an exemplary verification system, consistent with disclosed embodiments.

FIG. 2 is a block diagram of an exemplary verification system 102, consistent with disclosed embodiments. Verification system 102 may include a computing device, a computer, a server, a server cluster, a plurality of clusters, and/or a cloud service, consistent with disclosed embodiments. As shown, verification system 102 may include one or more processors 210, one or more I/O sections 220, and at least one memory 230. In some embodiments, some or all components of verification system 102 may be hosted on a device, a computer, a server, a cluster of servers, or a cloud service. In some embodiments, verification system 102 may be a scalable system configured to efficiently manage resources and enhance security by provisioning computing resources in response to triggering events and terminating resources after completing a task (e.g., a scalable cloud service that spins up and terminates container instances).

FIG. 2 depicts an exemplary configuration of verification system 102. As will be appreciated by one skilled in the art, the components and arrangement of components included in verification system 102 may vary. For example, as compared to the depiction in FIG. 2, verification system 102 may include a larger or smaller number of processors, I/O devices, or memory units. In addition, verification system 102 may further include other components or devices not depicted that perform or assist in the performance of one or more processes consistent with the disclosed embodiments. The components and arrangements shown in FIG. 2 are not intended to limit the disclosed embodiments, as the components used to implement the disclosed processes and features may vary.

Processor 210 may comprise known computing processors. Processor 210 may comprise a single-core or multiple-core processor that executes parallel processes simultaneously. In some embodiments, processor 210 may include a microprocessor. For example, processor 210 may be a single-core processor configured with virtual processing technologies. In some embodiments, processor 210 may use logical processors to simultaneously execute and control multiple processes. Processor 210 may implement virtual machine technologies, or other known technologies to provide the ability to execute, control, run, manipulate, store, etc., multiple software processes, applications, programs, etc. In another embodiment, processor 210 may include a multiple-core processor arrangement (e.g., dual core, quad core, etc.) configured to provide parallel processing functionalities to allow execution of multiple processes simultaneously. One of ordinary skill in the art would understand that other types of processor arrangements could be implemented that provide for the capabilities disclosed herein. The disclosed embodiments are not limited to any type of processor. Processor 210 may execute various instructions stored in memory 230 to perform various functions of the disclosed embodiments described in greater detail below. Processor 210 may be configured to execute functions written in one or more known programming languages.

In verification system 102, an input/output (I/O) section 220 may include at least one of a display, an LED, a router, a touchscreen, a keyboard, a microphone, a speaker, a haptic device, a camera, a button, a dial, a switch, a knob, a transceiver, an input device, an output device, or other input/output device to perform methods of the disclosed embodiments. I/O section 220 may comprise an interface 222 (e.g., a user interface).

Interface 222 may be configured to manage interactions between system 100 and other systems using network 114. In some aspects, interface 222 may be configured to publish data received from other components of system 100. This data may be published in a publication and subscription framework (e.g., using APACHE KAFKA), through a network socket, in response to queries from other systems, or using other known methods. Data may include tokens, as described herein. As an additional example, interface 222 may be configured to provide information received from other components of system 100 regarding datasets. In various aspects, interface 222 may be configured to provide data or instructions received from other systems to components of system 100. For example, interface 222 may be configured to receive instructions for generating data models (e.g., instructions identifying a type of data model, data model parameters, training data indicators, training parameters, or the like) from another system and provide this information to programs 235. As an additional example, interface 222 may be configured to receive data including sensitive data from another system (e.g., in a file, a message in a publication and subscription framework, a network socket, or the like) and provide that data to programs 235 or store that data in, for example, data storage 231, token system 104, token database 106, and/or verification database 108.

In some embodiments, interface 222 may include a user interface configured to receive user inputs and provide data to a user (e.g., a data manager). For example, interface 222 may include a display, a microphone, a speaker, a keyboard, a mouse, a track pad, a button, a dial, a knob, a printer, a light, an LED, a haptic feedback device, a touchscreen and/or other input or output devices.

Memory 230 may be a volatile or non-volatile, magnetic, semiconductor, optical, removable, non-removable, or other type of storage device or tangible (i.e., non-transitory) computer-readable medium, consistent with disclosed embodiments. As shown, memory 230 may include data storage 231, storing at least one of encrypted data or unencrypted data. Consistent with disclosed embodiments, data storage 231 may include datasets, model data (e.g., model parameters, training criteria, performance metrics, etc.), and/or other data.

Programs 235 may include one or more programs (e.g., modules, code, scripts, or functions) used to perform methods consistent with disclosed embodiments. Programs may include operating systems (not shown) that perform known operating system functions when executed by one or more processors. Disclosed embodiments may operate and function with computer systems running any type of operating system. Programs 235 may be written in one or more programming or scripting languages. One or more of such software sections or modules of memory 230 may be integrated into a computer system, non-transitory computer-readable media, or existing communications software. Programs 235 may also be implemented or replicated as firmware or circuit logic.

Programs 235 may include a trainer 236, a token manager 237, a verifier 238, and/or other components (e.g., modules) not depicted to perform methods of the disclosed embodiments. In some embodiments, components of programs 235 may be configured to generate ("spin up") one or more ephemeral container instances (e.g., an AMAZON LAMBDA instance, or AMAZON ECS container instance) to perform a task and/or to assign a task to a running (warm) container instance, consistent with disclosed embodiments. Components of programs 235 may be configured to receive, retrieve, and/or generate models, consistent with disclosed embodiments. Modules of programs 235 may be configured to perform operations in coordination with one another. In some embodiments, programs 235 may be configured to conduct an authentication process. In some embodiments, trainer 236, token manager 237, verifier 238, and/or other components may include programs to manage and direct steps of process 300, 400 and/or 500, as described below (e.g., programs to send and receive commands to and from other components of system 100, within verification system 102, and/or outside system 100).

Trainer 236 may include programs (e.g., scripts, functions, algorithms) to train, implement, store, receive, retrieve, and/or transmit one or more machine-learning models. Machine-learning models may include a neural network model, a gradient boosting machine model, an attention network model, a generative adversarial model (GAN), a recurrent neural network (RNN) model, a deep learning model (e.g., a long short-term memory (LSTM) model), a random forest model, a convolutional neural network (CNN) model, an RNN-CNN model, an LSTM-CNN model, a temporal-CNN model, a support vector machine (SVM) model, a Density-based spatial clustering of applications with noise (DBSCAN) model, a k-means clustering model, a distribution-based clustering model, a k-medoids model, a natural-language model, and/or another machine-learning model. Models may include an ensemble model (i.e., a model comprised of a plurality of models). In some embodiments, training of a model may terminate when a training criterion is satisfied. Training criterion may include a number of epochs, a training time, a performance metric (e.g., an estimate of accuracy in reproducing test data), or the like. Trainer 236 may be configured to adjust model parameters during training. Model parameters may include weights, coefficients, offsets, or the like. Training may be supervised or unsupervised. Training may include using an application framework such as TENSORBOARD, XGBOOST, JUPYTER and/or other frameworks. Training may include using machine learning applications like SCIKIT-LEARN, TENSORFLOW, CUDNN, KERAS, and/or the other machine-learning applications.

Trainer 236 may be configured to train machine learning models by optimizing model parameters and/or hyperparameters (i.e., hyperparameter tuning) using an optimization technique, consistent with disclosed embodiments. Hyperparameters may include training hyperparameters, which may affect how training of a model occurs, or architectural hyperparameters, which may affect the structure of a model. An optimization technique may include a grid search, a random search, a gaussian process, a Bayesian process, a Covariance Matrix Adaptation Evolution Strategy (CMA-ES), a derivative-based search, a stochastic hill-climb, a neighborhood search, an adaptive random search, or the like.

Trainer 236 may be configured to optimize statistical models using known optimization techniques.

In some embodiments, trainer 236 may be configured to generate models based on instructions received from another component of system 100 and/or a computing component outside system 100 (e.g., via interface 222).

Token manager 237 may be configured to perform methods of tokenization for data security, consistent with disclosed embodiments. Token manager 237 may be configured to manage tokens, consistent with disclosed embodiments. In some embodiments, token manager 237 may manage tokens in a data storage, including data storage 231, token system 104, and/or token database 106. In some embodiments, token manager 237 may include token system 104. In some embodiments, token manager 237 may be configured to receive a token from another device (e.g., external system 112) and retrieve corresponding tokenized data (e.g., sensitive data) from a data storage (e.g., from data storage 231, token system 104, and/or token database 106).

Verifier 238 may be configured to perform methods of adaptive token verification, consistent with disclosed embodiments. Adaptive token verification may include verifying a tokenized request from an external system. A tokenized request may include, for example, a transaction authorization request including a tokenized account number associated with a payment account. A request may include a system identifier of an external system, consistent with disclosed embodiments. For example, verifier 238 may receive a tokenized credit card number and a system identifier from an external system. The tokenized credit card number may be associated with an approved entity (e.g., a seller, merchant, financial institution, vendor, charity, political campaign, and/or any other entity). For example, the tokenized credit card number may be approved only for transactions originating or associated with an approved vendor. A system identifier may include, for example, a web address, an IP address, a name, a phone number, a physical address, an item number, a model number, a personal identifier of a user of the systems, or other system identifier. Verifier 238 may be configured to determine whether the external system matches the approved entity, based on one or more system identifiers, and may grant or block the request. Consistent with the present embodiments, verifier 238 may be configured to determine whether a tokenized request should be approved despite a mismatch between a received system identifier and a known system identifier.

Verifier 238 may be configured to generate and/or train a verification model to verify tokenized requests, consistent with disclosed embodiments. A verification model may include a gradient boosting machine model, a neural network model, and/or any other machine learning model, consistent with disclosed embodiments. Verifier 238 may be configured to train a verification model in coordination with trainer 236. Training a verification model may include using verification training data. Verification training data may be stored in, for example, data storage 231 and/or verification database 108. Verifier 238 may be configured to manage verification training data (e.g., store, retrieve, append, update, remove, delete, or otherwise manage verification training data).

Verification training data may comprise historical request data of a tokenized request and corresponding result data. In some embodiments, historical request data may be received by verification system 102 based on processing of tokenization requests by components of system 100. Alternatively or additionally in some embodiments, historical request data may be crowd-sourced by verification system 102 (e.g., crowd-sourced via requests sent to one or more client systems 110 and/or external systems 112). Request data may include system identifiers (e.g., a web address, a name, a phone number, or other system identifiers). System identifiers may be associated with a requesting system (e.g., external system 112). Request data may include substantive request information. Substantive request information may include any information relating to a request, such as a cost of an item for purchase, a medical condition, a course of study, a time of day, and/or other data relating to a request. In some embodiments, substantive request information may include user data or system data associated with a tokenization request (e.g., a user account associated with a tokenized credit card number and/or a financial institution issuing a tokenized credit card number). Accordingly, in some embodiments, based on historical request data, verifier 238 may learn to associate a token with a plurality of system identifiers.

Result data may include data indicating whether a tokenized request should be granted or denied and/or was properly granted or denied. For example, result data may include a verification challenge indicating that a granted (or denied) tokenized request may have been improperly granted (or denied). As another example, result data may include data received prior to granting (or denying) a tokenized request, the received data indicating a tokenized request may be legitimate (or a fraudulent), such as data received in response to a prompt to a client device during or after processing of a tokenized request. As another example, result data may specify that a granted (or denied) tokenized request received no verification challenges after a predetermined time period (e.g., hours, days, weeks, or other time period), suggesting that a tokenized request may have been properly granted (or denied).

Verifier 238 may be configured to generate a string comparison metric, consistent with disclosed embodiments. A string comparison metric may include a distance metric, a strict equality test result, a Jaro-Winkler distance, an edit distance, a longest common substring, a cosine distance, a jaccard distance, or other comparison metric.

Verifier 238 may be configured to generate a match flag, consistent with disclosed embodiments. A match flag may be associated with a tokenized request and indicate a level of confidence that a tokenized request is legitimate (e.g., one of a high confidence, medium confidence, or low confidence that a tokenization request is legitimate). A match flag may be based on a match between a system identifier and a known system identifier in a data storage (e.g., data storage 231, verification database 108, and/or another data storage).

Verifier 238 may be configured to generate a category metric of a system identifier, consistent with disclosed embodiments. A category metric may be based on a similarity between a system identifier and a category associated with a token of a request. For example, a category associated with a token of the request may include a category such as "Women's Clothing." A category metric may be based on a word2vec semantic similarity between system identifiers (e.g., keywords, web addresses, or other identifiers) and known system identifiers stored in a data storage (e.g., data storage 231, verification database 108, or other data storage). Known system identifiers may be associated with a token (e.g., an identifier of an approved entity may be associated with a token).

Verifier 238 may include a rule-based algorithm configured to verify a tokenized request (e.g., a verification model may include an expression and/or rule-based algorithm). For example, a rule-based algorithm may comprise a rule to grant (or deny) a tokenized request based on a condition. For example, a rule may be to grant (or deny) a tokenized request if the request originates from a specified Internet Protocol (IP) address. In some embodiments for example, a rule-based algorithm may comprise a rule to request verification data from a client device based on a condition (e.g., a cost threshold, a request-frequency threshold, a request originating from an IP address or domain associated with no previous requests, and/or any other condition). It should be understood that the examples of rule-based algorithms provided herein are provided for purposes of illustration only and are not limiting on the embodiments.

Figure 3:
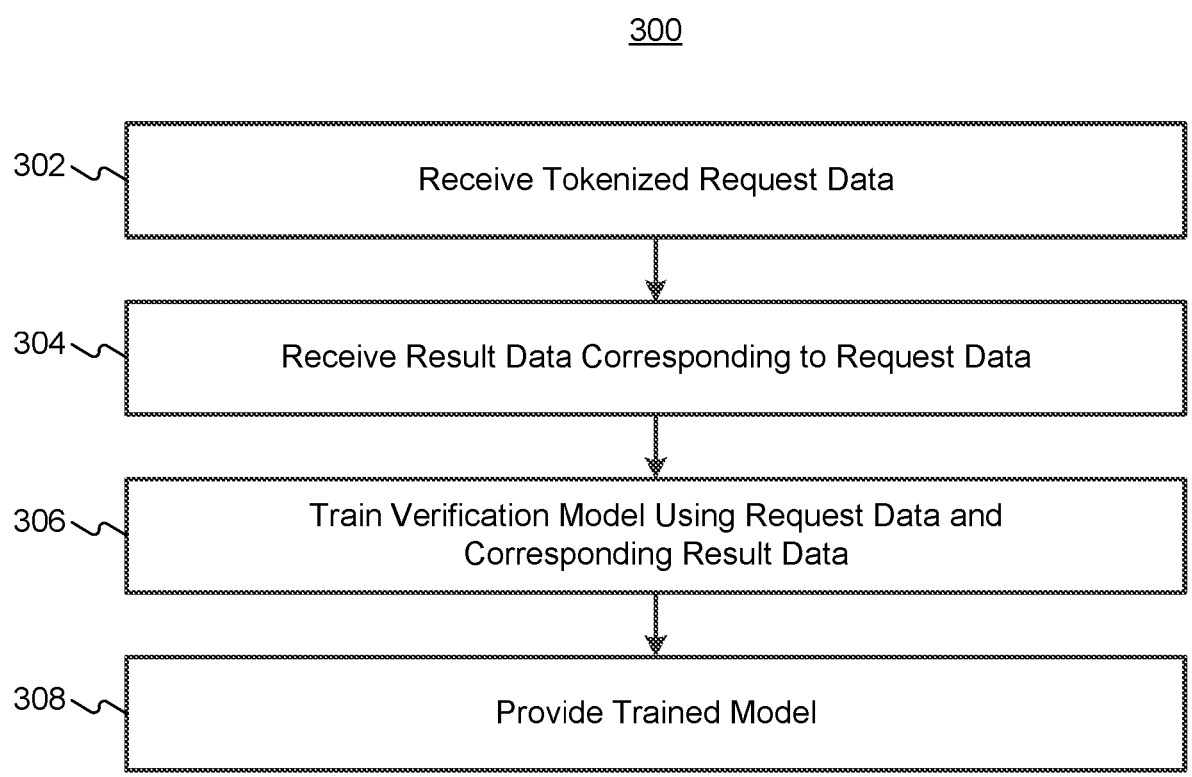
FIG. 3 is flow chart of an exemplary process for training a verification model, consistent with disclosed embodiments.

FIG. 3 is flow chart of an exemplary process 300 for training a verification model, consistent with disclosed embodiments. Process 300 may be performed to train a new verification model. In some embodiments, process 300 may be performed to update an existing verification model.

In some embodiments, verification system 102 may perform process 300 using programs 235. One or more of trainer 236, data profiler 237, verifier 238 and/or other components of programs 235 may perform operations of process 300, consistent with disclosed embodiments. It should be noted that other components of system 100, including, for example, client system 110 may perform operations of one or more steps of process 300. In some embodiments, one or more steps of process 300, 400, and process 500 may be part of a same process.

Consistent with disclosed embodiments, steps of process 300 may be performed on one or more cloud services using one or more ephemeral container instances (e.g., AMAZON LAMBDA). For example, at any of step of process 300, verification system 102 may generate (spin up) an ephemeral container instance to execute a task, assign a task to an already-running ephemeral container instance (warm container instance), or terminate a container instance upon completion of a task. As one of skill in the art will appreciate, steps of process 300 may be performed as part of an application interface (API) call.

At step 302, verification system 102 may receive tokenized request data, consistent with disclosed embodiments. Tokenized request data may include data relating to historical tokenized requests (e.g., verification training data). Tokenized request data may include data relating to a single request (e.g., data that may be used to update an existing verification model). Request data of a tokenized request may include a token, one or more system identifiers of a requesting system (e.g., external system 112), and/or substantive request data, consistent with disclosed embodiments. Consistent with the present embodiments, a system identifier may include a name (e.g., a name of a corporation, a web address, an IP address, a phone number, a physical address, and/or any other system identifier). Substantive request data may include information relating to a tokenized request such as a transaction amount, a location, a course, a medical diagnosis and/or any other information.

Verification system 102 may receive tokenized request data from token database 106, data storage 231, external system 112, and/or other computing device. In some embodiments, at step 302, client system 110 transmits a command to verification system 102, the command comprising an instruction to generate a verification model. Receiving tokenized request data may include retrieving tokenized request data from a data storage in response to the command.

At step 304, verification system 102 may receive result data corresponding to tokenized request data, consistent with disclosed embodiments. Result data may indicate whether a tokenized request was properly or improperly granted (or denied), consistent with disclosed embodiments. Result data may include a verification challenge and/or an absence of a verification challenge during a time period. Verification system 102 may receive result data from token database 106, data storage 231, client system 110, and/or other computing device.

At step 306, verification system 102 may train a verification model to verify tokenized requests using tokenized request data and result data, consistent with disclosed embodiments. For example, trainer 236 may optimize a verification model using request data and result data. Consistent with the present embodiments, a verification model may include a gradient boosting machine model and/or any other machine learning model.

In some embodiments, a verification model may be trained to generate verification model output. Verification model output may include a binary result associated with the tokenized request (e.g., information specifying whether to grant or deny a tokenization request). Verification model output may include a likelihood or score reflecting a confidence or probability that a tokenization request is illegitimate (i.e., unauthorized).

Verification model output may include a string comparison metric between the system identifier and a known system identifier. A string comparison metric may include a distance metric, a strict equality test result, a Jaro-Winkler distance, an edit distance, a longest common substring, a cosine distance, a jaccard distance, or other comparison metric.

Verification model output may include a match flag associated with the tokenized request (e.g., one of a high confidence, medium confidence, or low confidence that a tokenization request is legitimate). A match flag may be based on a match between a system identifier associated with a tokenized request and a known system identifier in a data storage (e.g., verification database 108).

In some embodiments, verification model output may include a category metric of the system identifier, the category metric being based on a similarity between the system identifier and a category associated with a token of the request. For example, a category associated with a token of the request may include a category such as "Women's Clothing." A category metric may be based on a word2vec semantic similarity between system identifiers (e.g., keywords, web addresses, or other identifiers) and known system identifiers stored in a data storage (e.g., data storage 231, verification database 108, or other data storage). Known system identifiers may be associated with a token (e.g., an identifier of an approved entity may be associated with a token).

At step 308, verification system 102 may provide a trained model, consistent with disclosed embodiments. Providing a model may include transmitting a model to client system 110 and/or storing a model in a data storage (e.g., data storage 231, verification database 108, and/or other data storage).

Figure 4:
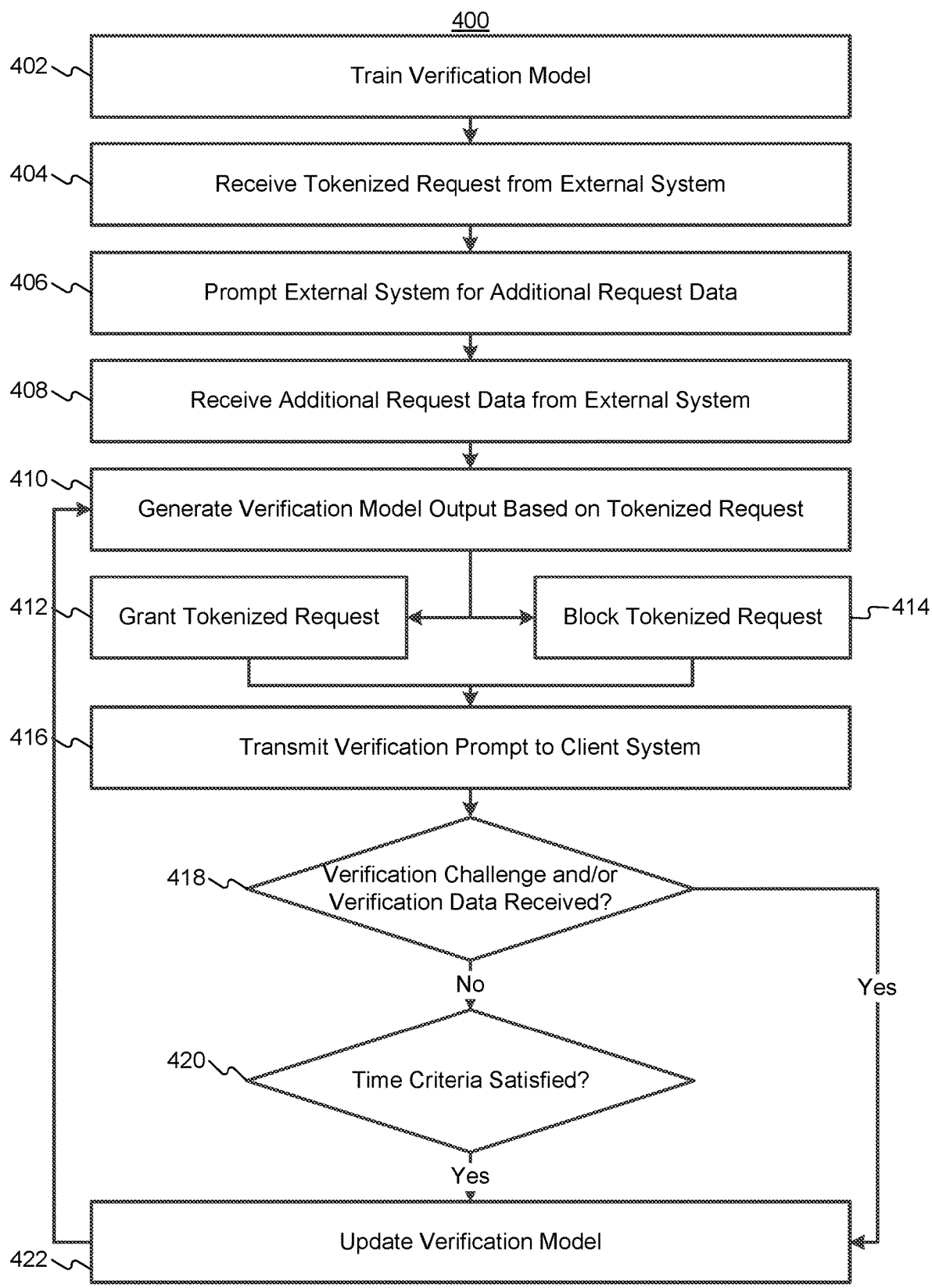
FIG. 4 is flow chart of an exemplary adaptive token verification process, consistent with disclosed embodiments.

FIG. 4 is flow chart of an exemplary adaptive token verification process 400, consistent with disclosed embodiments. In some embodiments verification system 102 may perform process 400 using programs 235. One or more of trainer 236, token manager 237, verifier 238 and/or other components of programs 235 may perform operations of process 400, consistent with disclosed embodiments. It should be noted that other components of system 100, including, for example, client system 110 may perform operations of one or more steps of process 400. In some embodiments, one or more steps of process 300, 400, and process 500 may be part of a same process.

Consistent with disclosed embodiments, steps of process 400 may be performed on one or more cloud services using one or more ephemeral container instances (e.g., AMAZON LAMBDA). For example, at any of step of process 400, verification system 102 may generate (spin up) an ephemeral container instance to execute a task, assign a task to an already-running ephemeral container instance (warm container instance), or terminate a container instance upon completion of a task. As one of skill in the art will appreciate, steps of process 400 may be performed as part of an application interface (API) call.

At step 402, verification system 102 may train a verification model, consistent with disclosed embodiments. Training a verification model may include implementing steps of process 300 (e.g., training a model using training data stored in a data storage).

At step 404, verification system 102 may receive a tokenized request from external system 112, consistent with disclosed embodiments. As an illustrative example, verification system 102 may receive a tokenized request to verify or otherwise process a tokenized credit card as payment for a purchase. A tokenized request at step 404 may include a system identifier including, for example, a web address associated with the tokenized request. A tokenized request at step 404 may include substantive information relating to a tokenized request including, for example, a payment amount and a category of item to be purchased (e.g., clothing).

At step 406, verification system 102 may prompt external system for additional request data, consistent with disclosed embodiments. For example, verification system may prompt external system for one or more additional system identifiers and/or for additional substantive request data, consistent with disclosed embodiments. In some embodiments, receiving additional request data includes retrieving data from a website associated with the tokenized request (e.g., a website associated with external system 112).

At step 408, verification system 102 may receive additional request data from external system 112, consistent with disclosed embodiments. Receiving additional request data from external system 112 may be in response to a prompt at step 406 or may be unprompted by verification system 102.

At step 410, verification system 102 may generate verification model output based on request data and/or additional data, consistent with disclosed embodiments. Verification model output may include a binary result associated with the tokenized request, a likelihood associated with the tokenized request, a match flag associated with the tokenized request, a category metric, and/or other verification model output. Verification model output may be based on a determination that a requesting system (e.g., external system 112) is an unknown system.

As shown in FIG. 4, one of steps 412 or 414 may follow step 410.

At step 412, verification system 102 may grant a tokenized request based on verification model output, consistent with disclosed embodiments. For example, granting a request may include processing a payment, issuing a report, allowing access to a system, and/or performing other substantive actions relating to a tokenized request, consistent with disclosed embodiments. In some embodiments, step 412 may include generating a recommendation to grant a tokenized request but may not include implementing the recommendation.

At step 414, verification system 102 may block (i.e., deny) a tokenized request based on verification model output, consistent with disclosed embodiments. For example, blocking a request may include rejecting a transaction authorization, issue a report, block access to a system, and/or perform other substantive actions relating to a tokenized request, consistent with disclosed embodiments. In some embodiments, step 414 may include generating a recommendation to block a tokenized request but may not include implementing the recommendation.

At step 416, verification system 102 may transmit a verification prompt to client system 110, consistent with disclosed embodiments. Client system 110 may be associated with a tokenized request. For example, client system 110 may be a user device associated with a credit card account, the credit card account being associated with a tokenized credit card number of a tokenized request. A verification prompt may include an indication that an action was performed at step 412 or 414 (i.e., an action to grant or block a tokenized request). A verification prompt may include a recommendation of step 412 or 414 (i.e., a recommendation to grant or block a tokenized request). In some embodiments, step 416 may include transmitting a notification to a client system 110, the notification comprising a completion status of a tokenization request indicating whether a request was granted or denied. In some embodiments, a verification prompt may include a request to provide information indicating whether a tokenization request may have been properly granted at step 412 or properly denied at step 414.

At step 418, verification system 102 may receive a verification challenge and/or verification data, consistent with disclosed embodiments. For example, client system 110 may transmit a verification challenge to verification system 102. A verification challenge may include information indicating that a tokenization request may have been improperly granted or improperly recommended for granting at step 412. A verification challenge may include information indicating that a tokenization request may have been improperly blocked or improperly recommended for blocking at step 414.

In some embodiments, a verification challenge may be received unprompted (e.g., not in response to a verification prompt of step 416). For example, a user may review account information (e.g., an account statement) and submit a verification challenge to verification system 102 via client system 110.

In some embodiments, verification data may be received at step 418 in response to a verification prompt transmitted at step 416. Verification data may include a verification challenge. Verification data may include information indicating that a tokenization request was properly granted (or denied). Verification data may include information indicating that a tokenization request was properly recommended for granting (or denial). Verification data may be received from client system 110 based on user inputs. In some embodiments, verification data may be received from client system 110 as a feed, subscription service, a push event, a scheduled data transfer, and/or other transfer mechanism.

As shown in FIG. 4, if a verification challenge is received at step 418, step 422 may be performed to update a verification model, consistent with disclosed embodiments. That is, updating the verification model may be based on the verification challenge. In some embodiments, if verification data is received at step 418, step 422 may follow step 418. For example, a verification model may be updated if the verification data indicates a tokenized request may have been properly or improperly granted at step 412, recommended for granting at step 412, blocked at step 414, or recommended for blocking at step 414. That is, updating a verification model may be based on verification data.

At step 420, verification system 102 may determine whether time criteria have been satisfied in which no verification challenge and/or verification data has been received, consistent with disclosed embodiments. For example, time criteria may include a predetermined time interval following a granting of a tokenized request at step 412, a recommendation to grant a tokenized request at step 412, a blocking of a tokenized request at step 414, and/or a recommendation to block a tokenized request at step 414. A predetermined time interval may include any duration, such as a number of hours, days, weeks, and/or other time period.

As shown in FIG. 4, if time criteria are satisfied at step 420, step 422 may follow step 420. Accordingly, when time criteria have been satisfied in which no verification challenge or verification data has been received, a verification model may learn based on an action or recommendation of steps 412 and/or 414. That is, updating a verification model may be based on a determination that no verification challenge has been received during a predetermined time interval.

At step 422, verification system 102 may update a verification model, consistent with disclosed embodiments. Updating a verification model may include performing steps of process 300. Updating a verification model may include training a model based on a verification challenge, verification data, and/or a satisfaction of time criteria, consistent with disclosed embodiments.

As shown in FIG. 4, in some embodiments, step 410 may follow step 422, which may cause some or all of steps 412-422 to repeat. For example, verification system may generate a recommendation to grant or block a tokenized request at step 412 and 414, transmit a verification prompt at step 416, receive verification data at step 418 indicating that the recommendation was improper, update the model at step 422, and repeat step 410 and one of steps 412 or 414 to process a tokenized request.

Figure 5:
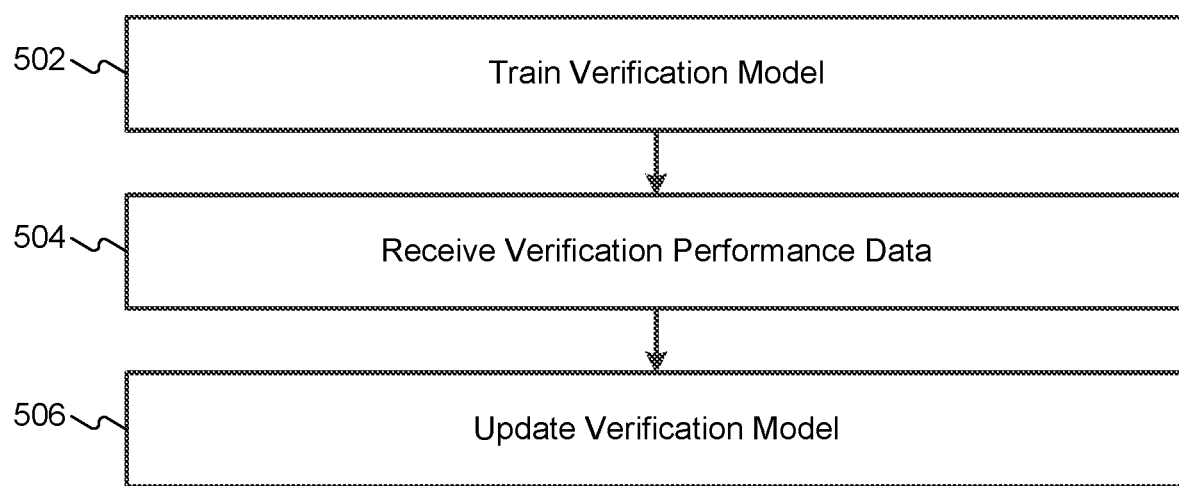
FIG. 5 illustrates an exemplary adaptive token verification process, consistent with disclosed embodiments.

FIG. 5 is flow chart of an exemplary adaptive token verification process 500, consistent with disclosed embodiments. In some embodiments verification system 102 may perform process 500 using programs 235. One or more of trainer 236, token manager 237, verifier 238 and/or other components of programs 235 may perform operations of process 500, consistent with disclosed embodiments. It should be noted that other components of system 100, including, for example, client system 110 may perform operations of one or more steps of process 500. In some embodiments, one or more steps of process 300, 400, and process 500 may be part of a same process.

Consistent with disclosed embodiments, steps of process 500 may be performed on one or more cloud services using one or more ephemeral container instances (e.g., AMAZON LAMBDA). For example, at any of step of process 500, verification system 102 may generate (spin up) an ephemeral container instance to execute a task, assign a task to an already-running ephemeral container instance (warm container instance), or terminate a container instance upon completion of a task. As one of skill in the art will appreciate, steps of process 500 may be performed as part of an application interface (API) call.

At step 502, verification system 102 may train a verification model, consistent with disclosed embodiments. In some embodiments, training a verification model may include performing steps of process 300.

At step 504, verification system 102 may receive verification performance data, consistent with disclosed embodiments. Verification performance data may include verification challenges and/or verification data as described herein. In some embodiments, verification performance data may include a statistical result of an analysis of historical request data of a tokenized request and corresponding result data associated with a verification model. For example, verification performance data may include a statistical result of an analysis of a plurality of implementations of process 400 (FIG. 4). A statistical result may include any known statistical result, such as a regression result of request and result data, an average, a correlation measure of request data and result data, and/or any other statistical result. In some embodiments, verification performance data may include a calculation of a portion of tokenized requests that are associated with verification challenges. Verification performance data may include a determination that a portion of tokenized requests associated with verification challenges exceeds a threshold.

At step 506 verification system 102 may update a verification model based on verification performance data, consistent with disclosed embodiments. For example, updating a verification model may be based on a determination that a portion of tokenized requests associated with verification challenges exceeds a threshold. Updating a verification model may include performing steps of process 300.

Systems and methods disclosed herein involve unconventional improvements over conventional approaches to verifying tokenization requests. Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure may be implemented as hardware alone.

Computer programs based on the written description and methods of this specification are within the skill of a software developer. The various functions, scripts, programs, or modules can be created using a variety of programming techniques. For example, programs, scripts, functions, program sections or program modules can be designed in or by means of languages, including JAVASCRIPT, C, C++, JAVA, PHP, PYTHON, RUBY, PERL, BASH, or other programming or scripting languages. One or more of such software sections or modules can be integrated into a computer system, non-transitory computer-readable media, or existing communications software. The programs, modules, or code can also be implemented or replicated as firmware or circuit logic.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. An adaptive token verification system, the system comprising:
    at least one memory storing instructions; and
    one or more processors configured to execute the instructions to perform operations comprising:
        training a verification model to verify tokenized requests based on respective system identifiers of the tokenized requests;
        receiving a tokenized request from an external system, the tokenized request comprising a system identifier of the external system, a payment request, and a tokenized credit card number;
        generating output of the verification model based on the system identifier;
        based on the output, performing one of:
            granting the tokenized request, the granting comprising retrieving an account number linked to the tokenized credit card number and processing the payment request using the account number; or
            blocking the tokenized request
        transmitting a verification prompt to a client device associated with the tokenized request, the verification prompt indicating whether the tokenized request was granted or blocked;
        receiving, from the client device, verification data associated with the verification prompt; and
        updating the verification model based on the verification data.

2. The system of claim 1, where the operations further comprise receiving a verification challenge from a client device, the verification challenge being associated with the tokenized request, and updating the verification model based on the verification challenge.

3. The system of claim 1, wherein the operations further comprise:
    determining that no verification challenge has been received during a predetermined time interval; and
    updating the verification model based on the determination.

4. The system of claim 1, wherein blocking the tokenized request comprises removing the token from a token database.

5. The system of claim 1, wherein blocking the tokenized request comprises generating a new token.

6. The system of claim 1, wherein the verification model output comprises a verification score reflecting a probability that the tokenized request is unauthorized.

7. The system of claim 1, wherein the operations further comprise:
    calculating a portion of tokenized requests that are associated with verification challenges;
    determining that the portion exceeds a threshold; and
    updating the verification model based on the determination.

8. The system of claim 1, wherein the operations further comprise transmitting a notification to a client device, the notification comprising a completion status of the tokenized request.

9. The system of claim 1, wherein the output comprises a string comparison metric between the system identifier and a known system identifier associated with the tokenized credit card number.

10. The system of claim 1, wherein the output comprises a category metric of the system identifier, the category metric being based on a similarity between the system identifier and a category associated with a token of the tokenized request.

11. The system of claim 1, wherein the output comprises a match flag based on a match between the system identifier and an identifier in a verification database.

12. The system of claim 1, wherein:
    the operations further comprise retrieving data from a website associated with the external system; and
    generating output comprises generating output of the verification model based on the retrieved data.

13. The system of claim 1, wherein the operations further comprise determining that the external system is an unknown system and generating output comprises generating output of the verification model based on the determination.

14. The system of claim 1, wherein the verification model comprises at least one of a neural network or a rule-based algorithm.

15. The system of claim 1, wherein the verification model comprises a gradient boosting machine model.

16. The system of claim 1, wherein the tokenized credit card number is a virtual number.

17. A method for adaptive token verification the method comprising:
    training a verification model to verify tokenized requests based on respective system identifiers of the tokenized requests;
    receiving a tokenized request from an external system, the tokenized request comprising a system identifier of the external system, a payment request, and a tokenized payment number;
    generating output of the verification model based on the system identifier the output indicating a match, within a predetermined similarity threshold, between the system identifier and a known system identifier previously associated with the tokenized payment number;
    based on the output, performing one of:
        granting the tokenized request, the granting comprising retrieving an account number linked to the tokenized payment number and processing the payment request using the account number; or blocking the tokenized request;
        transmitting a verification prompt to a client device associated with the tokenized request, the verification prompt indicating whether the tokenized request was granted or blocked;
        receiving, from the client device, verification data associated with the verification prompt; and
        updating the verification model based on the verification data.

18. An adaptive token verification system, the system comprising:
    at least one memory storing instructions; and
    one or more processors configured to execute the instructions to perform operations comprising:
        training a verification model to verify tokenized requests based on respective system identifiers of the tokenized requests;

receiving a tokenized request from an external system, the tokenized request comprising a system identifier of the external system, a payment request, and a tokenized payment number;

generating output of the verification model based on the system identifier, the output comprising at least one of:

a string comparison metric between the system identifier and a known system identifier previously associated with the tokenized payment number;

a category metric of the system identifier, the category metric being based on a similarity between the system identifier and a category associated with the tokenized payment number; or a match flag based on a match between the system identifier and an identifier in a verification database;

based on the output, performing one of:

granting the tokenized request, the granting comprising retrieving an account number linked to the tokenized payment number and processing the payment request using the account number;

or blocking the tokenized request; and updating the verification model based on one of a verification challenge or a determination that no verification challenge has been received during a predetermined time interval.

\* \* \* \* \*